US008645677B2

(12) United States Patent
Khosravi et al.

(10) Patent No.: US 8,645,677 B2
(45) Date of Patent: Feb. 4, 2014

(54) SECURE REMOTE CREDENTIAL PROVISIONING

(75) Inventors: Hormuzd M. Khosravi, Portland, OR (US); Peter R. Munguia, Chandler, AZ (US); Adrian R. Pearson, Hillsboro, OR (US); Steve J. Brown, Chandler, AZ (US); David A. Schollmeyer, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/247,042

(22) Filed: Sep. 28, 2011

(65) Prior Publication Data

US 2013/0080764 A1  Mar. 28, 2013

(51) Int. Cl.
*G06F 21/00* (2013.01)
(52) U.S. Cl.
USPC .......................................... 713/150; 713/182
(58) Field of Classification Search
USPC ................................................ 713/150, 182
See application file for complete search history.

(56) References Cited

U.S. PATENT DOCUMENTS

| 8,205,238 B2 * | 6/2012 | Blumenthal et al. ............... 726/1 |
| 2008/0148061 A1 * | 6/2008 | Jin et al. ......................... 713/187 |
| 2012/0137137 A1 * | 5/2012 | Brickell et al. ................. 713/182 |

OTHER PUBLICATIONS

Intel Corporation, "Intel Atom Processor CE4100," 2009, 4 pages.
Sundeep Bajikar, "Trusted Platform Module (TPM) based Security on Notebook PCs—White Paper," Jun. 20, 2002, 20 pages.

* cited by examiner

*Primary Examiner* — Jeffrey Pwu
*Assistant Examiner* — William Corum, Jr.
(74) *Attorney, Agent, or Firm* — Trop, Pruner & Hu, P.C.

(57) ABSTRACT

An embodiment uses hardware secrets secured within a security engine to provide a secure solution for field key provisioning. An embodiment is operating system independent due to the out-of-band communications with the security engine. Secrets need not be provisioned during manufacturing time. An embodiment may ensure only security engine specific provisioned secrets are used at runtime. Other embodiments are addressed herein.

18 Claims, 4 Drawing Sheets

SECURE REMOTE CREDENTIAL PROVISIONING

BACKGROUND

System-on-a-chip (SoC) platforms are used in many different devices such as digital televisions, set-top boxes that provide programming to televisions, Smartphones, tablets, laptops, netbooks, internet application delivery platforms, and the like. Many of these devices have multimedia applications that involve premium content delivery (e.g., streaming) to the platform. In order to protect the premium content different Digital Rights Management (DRM) technologies are used. These DRM and conditional access (CA) technologies require certain confidential credential material (e.g., keys, certificates) to be provisioned on these platforms.

However, not all keying material can be provisioned on platforms during manufacturing. To do so is both expensive and inflexible given the nature of downloadable applications in these devices. For example, existing DRMs are often updated or replaced by new ones, or require key re-provisioning due to compromised keys. Thus, field credential provisioning is required but doing so, in a secure manner, is difficult. For example, field provisioning using only software-based security measures leaves the process exposed to security breaches (e.g., malware, snooping, and the like).

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment.

An embodiment securely provisions confidential keying material related to DRMs or CAs into platforms (e.g., SoC). In doing so, the embodiment provides platform-specific, and even SoC-specific, provisioning of credentials (e.g., credentials, keys) to a platform, and even a SoC included in the platform, which has a secret root-of-trust that is unknown to a provider, such as a provider of encrypted data. This provisioning is secure and may occur when the device is in the field (i.e., after it has left the trusted manufacturing environment). An embodiment creates protected key records to be included in an update and robustly integrated with DRMs (and other software) running on platforms already deployed in the field.

Figure 1:
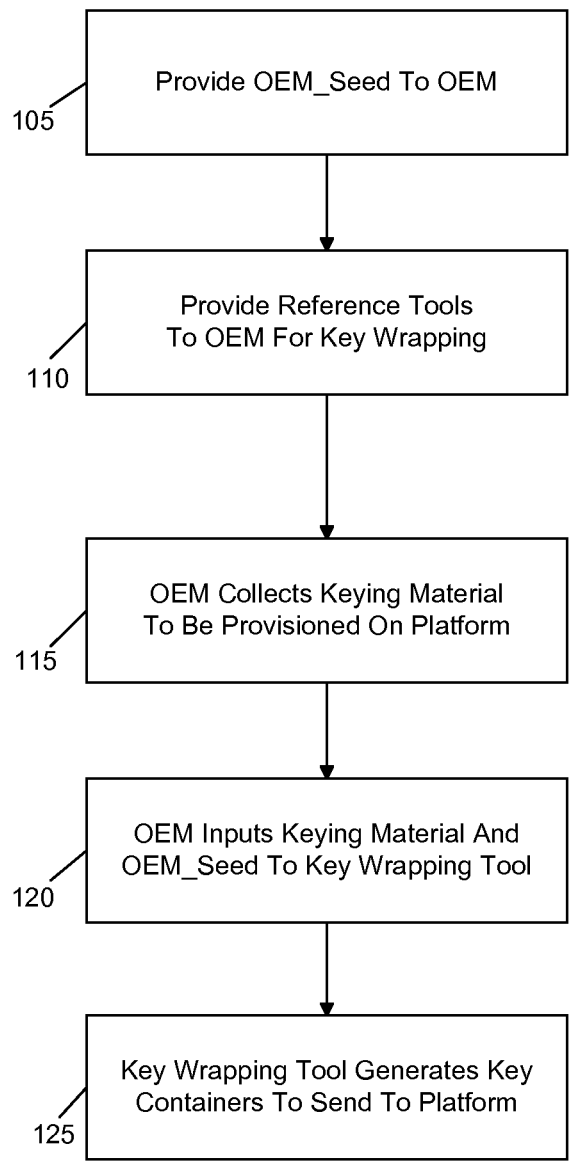
FIG. 1 includes a schematic flow chart in an embodiment.

FIG. 1 includes a schematic flow chart in an embodiment. Block 105 includes providing an OEM_Seed to an OEM. For example, an OEM_Seed may be a shared symmetric secret key (e.g., 128 bits) between a platform (e.g., digital TV) and an OEM (e.g., manufacturer of the digital TV). The symmetric secret key may be generated by a security engine included the platform. The security engine may include, for example, a cryptographic micro-controller such as a Trusted Platform Module (TPM). Details regarding TPMs are included, for example, at http://www*intel*com/design/mobile/platform/downloads/Trusted_Platform_Module_White_Paper*pdf.

The OEM_Seed may be based on certain fuses blown in the security engine. The blown fuses may represent an OEM or vendor identifier (e.g., Vendor ID). The OEM_Seed may be provided to the OEM from the security module manufacturer. The OEM_Seed is unique to the OEM. For example, there may be one OEM_Seed for a producer of television programming. That same producer may have another OEM_Seed for movie programming to be delivered to the same security engine. As addressed further below, the OEM_Seed may be a Global Key Encryption Key (GKEK) which is unique per OEM and per hardware stock keeping unit (SKU). The key is global for all the OEM platforms with that SKU. For example, there may be one key for all set top boxes made by a certain manufacturer. Thus, there may be several OEM_Seeds for various SKUs of the producer. This OEM_Seed provides a hardware-based root of trust (e.g., hardware-based on the fuses within the security engine) that can be used to encrypt other secrets or keying material, such as credentials from an independent software vendor (ISV) or OEM. Thus, the OEM_Seed helps form a chain of trust that extends to the above mentioned secrets (e.g., keys that are wrapped by the OEM_Seed).

The OEM_Seed may be generated within the security engine using various techniques, such as using a key generator located within the security engine. For example, in one embodiment the OEM_Seed may be generated via the key generator as follows: OEM_Seed=AES-128D(FW SEED (key), ROM_CONST(64-bits)||fuse_status0||fuse_status1 [OEM-Encryption Key||OEM-Signature Key]=SHA256(FW OEM SEED). Thus, identifiers such as fuses within the security engine may be used to produce the OEM_Seed. In an embodiment the OEM_Seed may be based on Vendor ID, which relies on security engine fuses set by the security engine manufacturer. Thus, the OEM_Seed may be a derived secret that is derived from hardware secrets included in the platform's security engine.

In an embodiment, the security engine firmware image used to generate the OEM_Seed may be the same for all platforms (e.g., all digital televisions of a certain model). However, the different unique values for each OEM_Seed and each security engine may be based on the different fuse settings (e.g., Vendor ID) for each security engine. The firmware image does not need to change for each OEM.

Thus, in an embodiment there is a symmetric secret (OEM_Seed) shared between an OEM and a platform's security engine. The OEM_Seed is unique per OEM (per SKU). The OEM_Seed may be stored within the security engine. This OEM_Seed may be securely provided to the OEM by, for example, the security engine manufacturer. The OEM may then use the OEM_Seed as, for example, a GKEK (OEM_GKEK) as described further below. The global key is used to, for example, wrap or encrypt other keys. Such other keys may pertain to decrypted video or audio data associated with a television show or movie.

Returning to FIG. 1, as mentioned above block 105 includes providing an OEM_Seed to an OEM. Thus, at such at time the OEM_Seed, generated within the security engine of the platform (e.g., set top box) is now "shared". Specifically, in an embodiment a first instantiation or instance of the OEM_Seed is located with the OEM and a second instantiation or instance of the OEM_Seed is stored in the security engine included on the platform.

In block 110 the remotely located provider (e.g., OEM, ISV, customer—all remotely located from a platform located in the field) gains a tool to wrap provisioning material (e.g., keys for decrypting audio or visual data) with the OEM_Seed. In block 115 this provisioning material is collected. The material may be collected from an ISV and the like. In block 120 the credential material, along with the OEM_Seed, are both input into the wrapping tool to generate a container wrapped with the OEM_Seed. The container will be securely delivered to the platform where only the proper platform, itself including an OEM_Seed and the proper identifier (e.g., fuse-based Vendor ID), can decrypt the credential materials. Thus, there is unique keying material for each platform based on the security engine-specific OEM_Seed.

Figure 2:
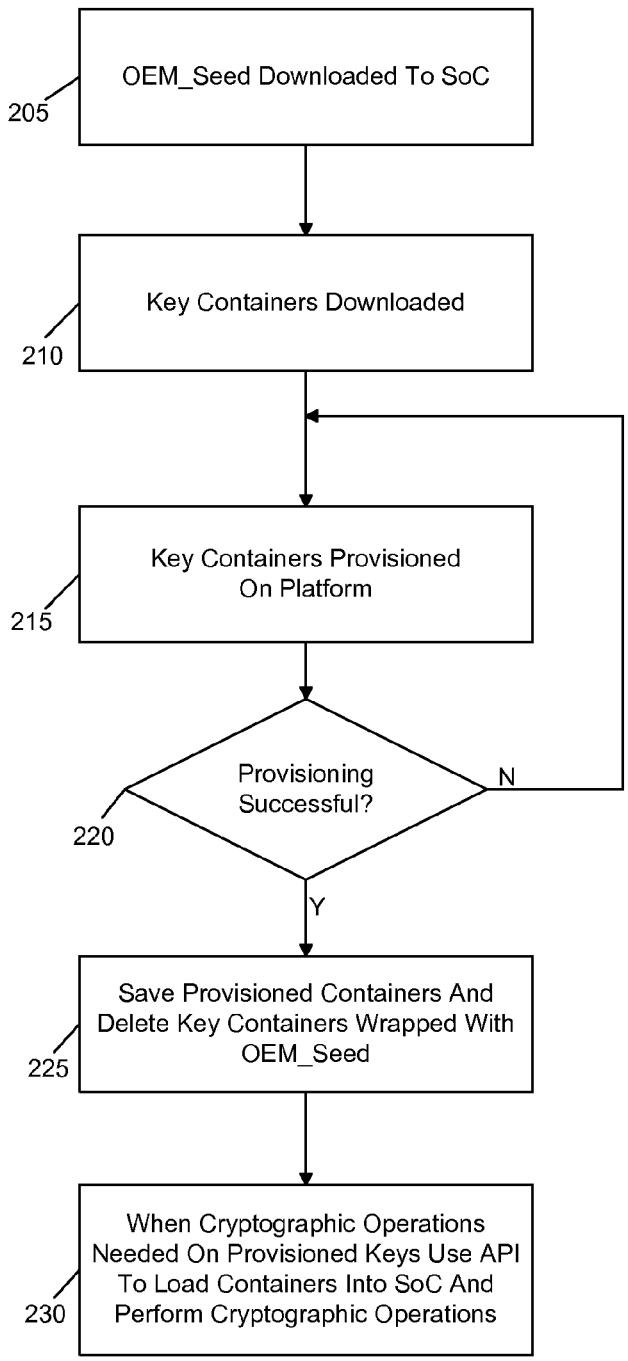
FIG. 2 includes a schematic flow chart in an embodiment.

FIG. 2 includes a schematic flow chart in an embodiment. In block 205 the OEM_Seed is downloaded, in encrypted (i.e., wrapped) form, from a location on the platform (e.g., any of various memory locations) and into the security engine, where it is then decrypted in a secure environment that is out-of-band from the platform processor running, for example, an operating system.

In block 210 the platform receives the credential container from the remotely located provider (e.g., OEM). See FIG. 1 for details regarding the container preparation. In block 215 the platform provisions OEM/ISV keys from the key container into the security engine. This may be done using the security engine application programming interface (APIs). Specifically, the now decrypted OEM_Seed located within the security engine is used to decrypt the container (e.g., via a decryption engine included in the security engine) and access the container credentials—all within the secure confines of the security engine.

Block 220 determines whether credential provisioning was successful. If not, the process may repeat and return to block 215 or possibly abort and end the provisioning process. However, if provisioning is successful then in block 225 the provisioned credentials may be wrapped, via an encryption engine included in the security engine, with on chip secrets (e.g., wrapped with secrets based on Vendor ID embedded in the security chip). Once wrapped the credentials may be securely stored within the security engine or elsewhere on the platform. In one embodiment, keys are uniquely wrapped with on-chip secrets and stored in non-volatile memory (e.g., flash memory) located on the platform. Thus, at this time the security engine and associated software utilities (e.g., APIs) have converted the OEM_Seed encrypted security data payload (e.g., binary large object (BLOB) including encryption keys) to a security engine specific provisioned payload that may no longer need to be encrypted with the OEM_Seed but may instead be decrypted/encrypted with other secrets tied to the security engine hardware on a per chip/platform basis (e.g., a "chip unique secret" with, possibly, other fuse settings for additional secrets to those necessarily associated with the OEM_Seed).

Furthermore, the container received from the remote provider may be destroyed, thereby ensuring the short lived nature of the container helps promote security by decreasing the amount of time secrets are exposed (to any extent) to hostile environments.

In block 230 when cryptographic operations are needed (e.g., possibly days or weeks later after the platform has been rebooted numerous times) the encrypted keys may be loaded back into the secure engine. For example, at a later date when encrypted content is to be viewed on the digital television the keys necessary to decrypt the content may be reloaded back into the security engine to commence decrypting the data. This reloading may be facilitated using various APIs associated with the security engine. The reloading is hidden from host software (e.g., operating system) operating on another processor out-of-band with the security engine.

Figure 3:
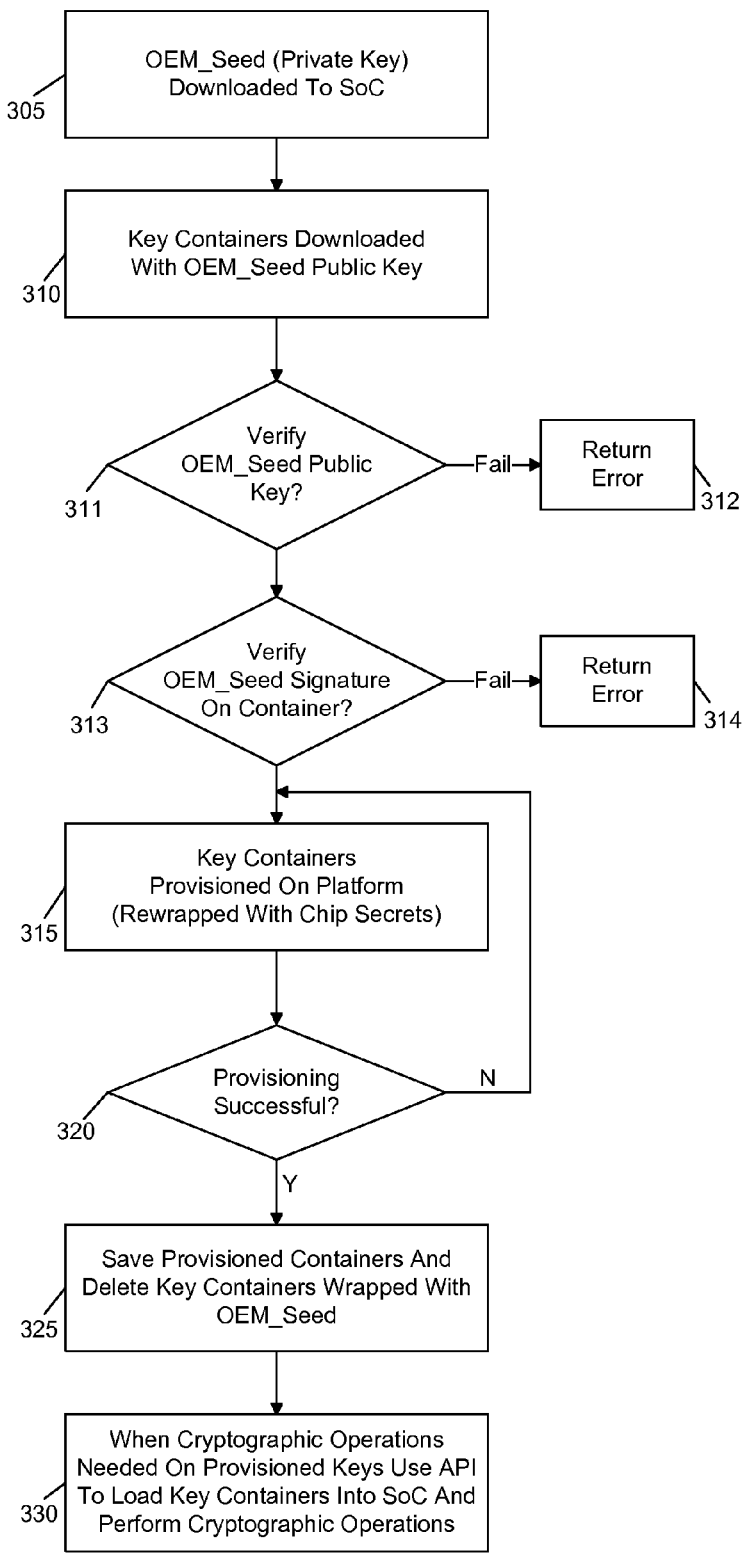
FIG. 3 includes a schematic flow chart in an embodiment.

FIG. 3 includes a schematic flow chart in an embodiment. Method 300 is similar to method 200 (FIG. 2). However, method 300 implements asymmetric keys (public-private key pair) whereas method 200 implements a symmetric OEM_Seed. Regardless, with method 300 a security engine provider may generate a set of OEM_Seed asymmetric keys (e.g., RSA public-private key pair) per OEM and possibly per SKU of each OEM. The security engine provider may deliver the public key to the OEM, which can be used for wrapping the OEM or ISV credentials (e.g., certificates, keying material), to the OEM or ISV.

Thus, in block 305 the private key of the OEM_Seed asymmetric key pair is downloaded, in encrypted (i.e., wrapped) form, from a location on the platform (e.g., any of various memory locations) and into the security engine, where it is then decrypted in a secure environment that is out-of-band from the platform processor running, for example, an operating system.

In block 310 the platform receives the credential container from the remotely located provider (e.g., OEM). Unlike method 200, the OEM_Seed is now wrapped with the public key of the OEM_Seed asymmetric key pair.

In block 311, the security engine includes a hash of, for example, the public key of the OEM_Seed asymmetric key pair. The OEM may have an OEM trusted boot public key. Regarding the container received in block 310, during the container preparation phase the OEM can generate the key container using the public key of the OEM_Seed asymmetric key pair. The OEM may also sign the entire key container with its trusted boot private key. The OEM will also include its trusted boot public key, along with the signed key container package, using a digital certificate. During the upgrade process 300, the security engine can validate the OEM Trusted boot public key using the hash of the key. The hash may be located in fuses on the security engine (block 311). Once this is validated (block 311), the OEM signature on the key container can be validated using the Trusted boot public key (block 313).

After blocks 311, 312 (return error if verification fails), 313, 314 (return error if verification fails), block 315 commences where the platform provisions OEM/ISV keys from the key container into the security engine. This may be done using a security engine API. Specifically, the now decrypted private OEM_Seed located within the security engine is used to decrypt the container and access the container credentials—all within the secure confines of the security engine.

Block 320 determines whether credential provisioning was successful. If not, the process may repeat and return to block

315 or possibly abort and end the provisioning process. However, if provisioning is successful in block 325 the provisioned credentials may be wrapped with on chip secrets (e.g., wrapped with secrets based on Vendor ID embedded in the security chip). Once wrapped the credentials may be securely stored within the security engine or elsewhere on the platform. In one embodiment, keys are uniquely wrapped with on-chip secrets and stored in non-volatile memory (e.g., flash memory) located on the platform. Furthermore, the container received from the remote container may be destroyed, thereby ensuring the short lived nature of the container helps promote security by decreasing the amount of time secrets are exposed (to any extent) to hostile environments.

In block 330 when cryptographic operations are again needed the encrypted keys may be loaded back into the secure engine. For example, at a later date when encrypted content is to be viewed on the digital television the keys necessary to decrypt the content may be reloaded back into the security engine to commence decrypting the data. This reloading may be facilitated using various APIs associated with the security engine—all hidden from host software (e.g., operating system) operating on another processor out-of-band with the security engine.

Thus, conventional methods provision security data/keys to the platform only during the platform manufacturing process. In some cases, secret data/keys are only protected via cryptographic software methods for provisioning platforms that have already left secure manufacturing environments and now reside in the field. Some situations even allow for limited quantities of secret data/keys to be provisioned directly into one-time programmable on-die nonvolatile memory (if sufficient space has been reserved). However, embodiments discussed herein may use firmware and/or hardware secrets secured within a security engine to provide a secure and robust solution for field key provisioning. Embodiments may be host operating system and/or software independent due to the out-of-band communications with the security engine. Secrets need not be provisioned during manufacturing time. Also, embodiments may provide a generic and extensible mechanism that can be used for provisioning multiple DRM or CA secrets in field. Also, embodiments are renewable after field deployment. Further, embodiments may block the unauthorized use of the platform provisioned secret data/keys and may ensure only SOC specific (e.g., security engine specific) provisioned secrets are used at runtime. Also, embodiments do not require knowledge of the SOC specific provisioning secrets to pre-provision the security data/keys at the platform manufacturer. This ability to "not know" the SOC specific secrets may be advantageous when the platform manufacturer does not have access or rights to that information.

An embodiment includes an article with instructions that when executed enable a system to: (a) receive a security credential (e.g., key for decrypting encrypted audio or video data), wrapped with a first instantiation of a first key (e.g., OEM_Seed), from a remotely located provider (e.g., an ISV or OEM); (b) decrypt the credential within a hardware security engine (e.g., a secure cryptoprocessor), using a second instantiation of the first key, which is out-of-band (e.g., may run invisibly to and independent of the system operating system) from a processor that runs an operating system for the system; and (c) wrap the credential based on an identifier permanently embedded in hardware included in the security engine; wherein (a) the first key is based on the identifier, and (b) the credential is received via an out-of-band communication. The security engine may include a root-of-trust unknown to the remotely located provider. For example, the root-of-trust may be based on blown fuses in the security engine, all of which is unknown to an ISV that produces keys to be field provisioned. The identifier may be based on blown fuses located in the security engine. The system may wrap the second instantiation of the first key based on the identifier; and store the wrapped second instantiation of the first key outside the security engine but within a platform that includes the security engine (e.g., in flash memory). The system may store the wrapped credential outside the security engine but within a platform that includes the security engine (e.g., in flash memory); receive the wrapped credential previously stored outside the security engine but within the platform; decrypt the wrapped credential based on the identifier; and decrypt video data based on the decrypted credential. The system may destroy a container before rebooting the system, wherein the credential was included in the container when the credential was received from the remotely located provider. The (a) the first and second instantiations of the first key may both be derived from the identifier, and (b) the identifier may be unique to the security engine.

Figure 4:
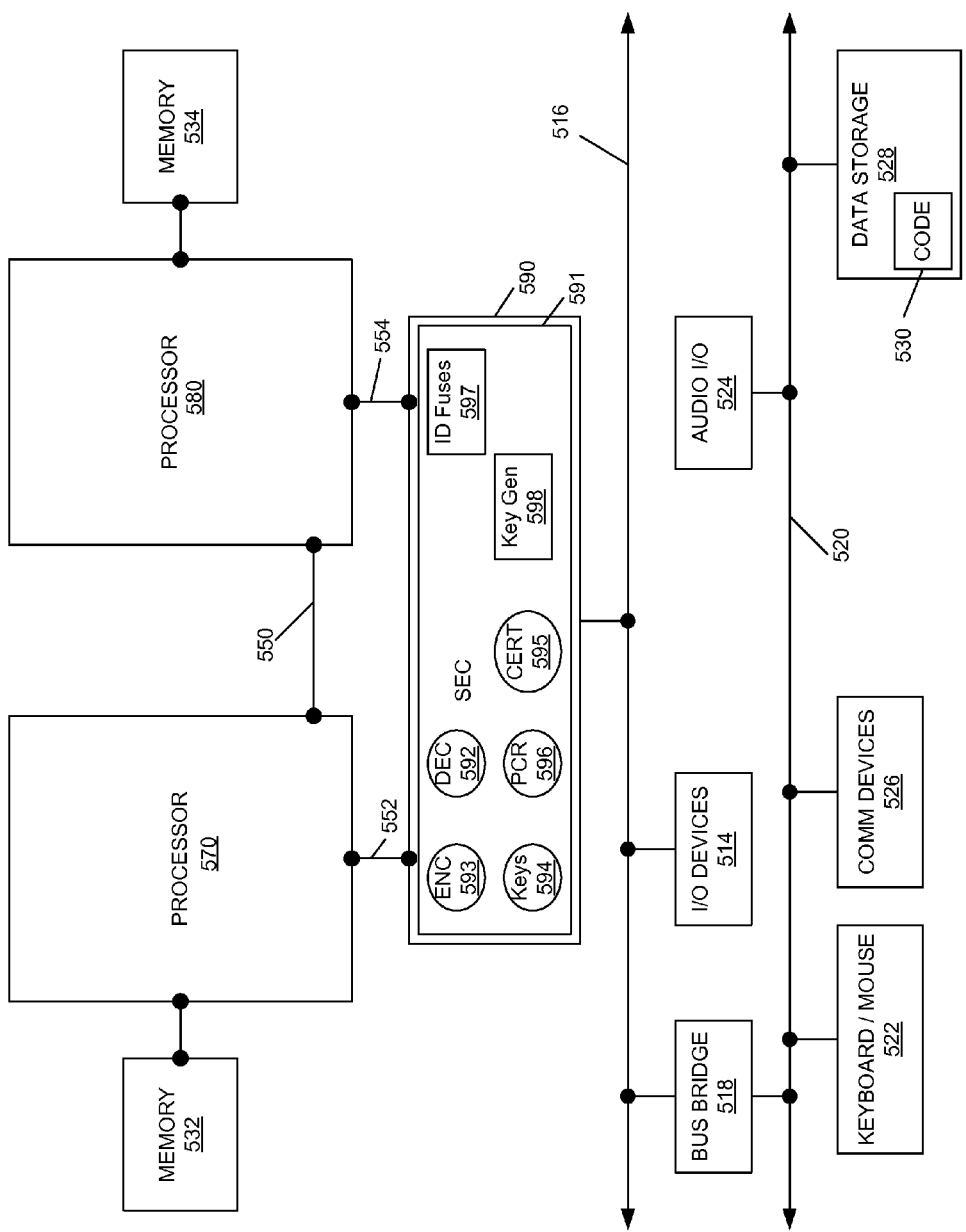
FIG. 4 includes a system for used with an embodiment.

FIG. 4 includes an example system for use with embodiments of the invention. Embodiments may be implemented in many different system types. Referring now to FIG. 4, shown is a block diagram of a system in accordance with an embodiment of the present invention. Multiprocessor system 500 is a point-to-point interconnect system, and includes a first processor 570 and a second processor 580 coupled via a point-to-point (P-P) interconnect 550. Each of processors 570 and 580 may be multicore processors. The term "processor" may refer to any device or portion of a device that processes electronic data from registers and/or memory to transform that electronic data into other electronic data that may be stored in registers and/or memory. First processor 570 may include a memory controller hub (MCH) and P-P interfaces. Similarly, second processor 580 may include a MCH and P-P interfaces. The MCHs may couple the processors to respective memories, namely memory 532 and memory 534, which may be portions of main memory (e.g., a dynamic random access memory (DRAM)) locally attached to the respective processors. First processor 570 and second processor 580 may be coupled to a chipset 590 via P-P interconnects, respectively. Chipset 590 may include P-P interfaces.

Chipset 590 may include a security engine or cryptographic processor 591 that includes, for example, RSA accelerators, encryption engine 593 and decryption engine 592, random number generators, keys 594, certificates 595, platform configuration registers (PCRs) 596 (a Trusted Platform Module register storing platform configuration measurements), ID fuses 597 (e.g., Vendor ID), and the like. Keys 594 may include endorsement keys, attestation keys, OEM_Seed. Key generator 598 may be included for creating keys like the OEM_Seed and the like. Again, details regarding one example of such a chipset are available at least at: http://www*intel*com/design/mobile/platform/downloads/Trusted_Platform_Module_White_Paper*pdf. Embodiments are not limited to working with any one type of security engine or cryptographic processor.

Furthermore, chipset 590 may be coupled to a first bus 516 via an interface. Various input/output (I/O) devices 514 may be coupled to first bus 516, along with a bus bridge 518, which couples first bus 516 to a second bus 520. Various devices may be coupled to second bus 520 including, for example, a keyboard/mouse 522, communication devices 526, and data storage unit 528 such as a disk drive or other mass storage device, which may include code 530, in one embodiment. Further, an audio I/O 524 may be coupled to second bus 520. While P-P interfaces are used in the above example, embodiments are not so limited and may include other direct and/or indirect interface methods.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions. Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered. Components or modules may be combined or separated as desired, and may be positioned in one or more portions of a device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory machine-accessible medium having instructions stored thereon, the instructions when executed on a machine cause the machine to:
receive a security credential, wrapped with a first instantiation of a first key, from a remotely located provider;
decrypt the credential within a hardware security engine using a second instantiation of the first key, the security engine being out-of-band from a processor that runs an operating system for the machine;
wrap the credential based on an identifier permanently embedded in hardware included in the security engine;
wrap the second instantiation of the first key based on the identifier; and
store the wrapped second instantiation of the first key in non-volatile memory that is outside the security engine, but within a platform that includes the security engine, and is in-band with the processor;
wherein (a) the first key is based on the identifier, and (b) the credential is received via an out-of-band communication.

2. The at least one medium of claim 1, wherein the security engine includes a root-of-trust unknown to the remotely located provider.

3. The at least one medium of claim 2, wherein the first key is based on the root-of-trust, the root-of-trust being hardware based.

4. The at least one medium of claim 1, wherein the first key is a symmetric key.

5. The at least one medium of claim 1, wherein the identifier is based on blown fuses located in the security engine.

6. The at least one medium of claim 1 including instructions that enable the machine to:
store the wrapped credential outside the security engine but within the platform that includes the security engine;
receive the wrapped credential previously stored outside the security engine but within the platform;
decrypt the wrapped credential based on the identifier; and
decrypt video data based on the decrypted credential.

7. The at least one medium of claim 1 including instructions that enable the machine to destroy a container before rebooting the machine, wherein the credential was included in the container when the credential was received from the remotely located provider.

8. The at least one medium of claim 1, wherein the security engine includes a trusted platform module.

9. The at least one medium of claim 1, wherein (a) the first and second instantiations of the first key are both derived from the identifier, and (b) the identifier is unique to the security engine.

10. At least one non-transitory machine-accessible medium having instructions stored thereon, the instructions when executed on a machine cause the machine to perform operations comprising:
receiving a security credential, wrapped with a first instantiation of a first key, from a remotely located provider;
decrypting the credential within a hardware security engine using a second instantiation of the first key, the security engine being out-of-band from a processor that runs an operating system for a platform that includes the security engine;
wrapping the credential based on an identifier permanently embedded in hardware included in the security engine;
storing the wrapped credential in non-volatile memory that is outside the security engine, but within the platform, and is in-band with the processor;
receiving the wrapped credential previously stored outside the security engine but within the platform;
decrypting the wrapped credential based on the identifier; and
decrypting video data based on the decrypted credential;
wherein (a) the first key is based on the identifier, and (b) the credential is received via an out-of-band communication.

11. At least one medium of claim 10, wherein the identifier is based on blown fuses located in the security engine.

12. At least one medium of claim 10, the operations comprising:
wrapping the second instantiation of the first key based on the identifier; and
storing the wrapped second instantiation of the first key outside the security engine but within the platform.

13. At least one medium of claim 10, wherein (a) the first and second instantiations of the first key are both derived from the identifier, and (b) the identifier is unique to the security engine.

14. An apparatus comprising:
a platform;
a memory coupled to the platform;
a processor coupled to the platform; and
a hardware security engine co-processor, coupled to the platform, to (a) receive a security credential, wrapped with a first instantiation of a first key, from a remotely located provider; (b) decrypt the credential, via a decryption engine included within the security engine, using a second instantiation of the first key; and (c) wrap the credential, via an encryption engine included within the security engine, based on an identifier permanently embedded in hardware included in the security engine;
wherein (a) the first key is based on the identifier, (b) the credential is received via an out-of-band communication, (c) the security engine is out-of-band from the processor, which operates an operating system for the apparatus; and (d) the processor is to store the wrapped credential in the memory, which is non-volatile, located outside the security engine, and in-band with the processor.

15. The apparatus of claim 14, wherein the identifier is based on blown fuses located in the security engine.

16. The apparatus of claim 14, wherein the security engine is to wrap the second instantiation of the first key based on the identifier; and the processor is to store the wrapped second instantiation of the first key in the memory, the memory being located outside the security engine.

17. The apparatus of claim 14, wherein:

the security engine is to receive the wrapped credential previously stored outside the security engine; decrypt the wrapped credential, via the decryption engine, based on the identifier; and decrypt video data based on the decrypted credential.

18. The apparatus of claim 14, wherein (a) the first and second instantiations of the first key are both derived from the identifier, and (b) the identifier is unique to the security engine.

\* \* \* \* \*